United States Patent
Li et al.

(10) Patent No.: US 9,951,260 B2
(45) Date of Patent: *Apr. 24, 2018

(54) VEGETABLE OIL-BASED PRESSURE SENSITIVE ADHESIVES

(71) Applicant: Oregon State University, Corvallis, OR (US)

(72) Inventors: Kaichang Li, Corvallis, OR (US); Anlong Li, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/068,291

(22) Filed: Mar. 11, 2016

(65) Prior Publication Data

US 2016/0194535 A1   Jul. 7, 2016

Related U.S. Application Data

(63) Continuation of application No. 13/701,782, filed as application No. PCT/US2011/039450 on Jun. 7, 2011, now Pat. No. 9,315,704.

(60) Provisional application No. 61/352,691, filed on Jun. 8, 2010, provisional application No. 61/394,726, filed on Oct. 19, 2010.

(51) Int. Cl.
C09J 191/00 (2006.01)
C09J 7/02 (2006.01)

(52) U.S. Cl.
CPC ........... *C09J 191/00* (2013.01); *C09J 7/0207* (2013.01); *C09J 2463/00* (2013.01); *Y10T 156/10* (2015.01); *Y10T 428/287* (2015.01)

(58) Field of Classification Search
CPC ......... C08G 59/52–59/50; C09J 163/00; C09J 7/0207; C09J 191/00; C09J 163/08
See application file for complete search history.

(56) References Cited

U.S. PATENT DOCUMENTS

| | | |
|---|---|---|
| 3,304,344 A | 2/1967 | Szawlowski |
| 4,910,287 A | 3/1990 | McLafferty et al. |
| 5,869,301 A | 2/1999 | Nghiem et al. |
| 6,121,398 A | 9/2000 | Wool et al. |

(Continued)

FOREIGN PATENT DOCUMENTS

| | | |
|---|---|---|
| GB | 1 298 325 | 11/1972 |
| JP | 58001739 A | 1/1983 |

(Continued)

OTHER PUBLICATIONS

Ashara et al., "Crosslinked Acrylic Pressure-Sensitives. I. Effect of the Crosslinking Reaction on Peel Strength," *J. of Appl. Polymer Sci.*, vol. 87, pp. 1493-1499, 2003.

(Continued)

*Primary Examiner* — Alexandre F Ferre
(74) *Attorney, Agent, or Firm* — Klarquist Sparkman, LLP

(57) ABSTRACT

A pressure sensitive adhesive construct comprising:
(a) a backing substrate; and
(b) a pressure sensitive adhesive composition disposed on the backing substrate, wherein the pressure sensitive adhesive includes a product made from at least one epoxidized vegetable oil and at least one dibasic acid or anhydride, or a combination of a dibasic acid or anhydride and a monobasic acid or anhydride.

11 Claims, 1 Drawing Sheet

(56) References Cited

U.S. PATENT DOCUMENTS

| | | | |
|---|---|---|---|
| 6,713,184 B1 | 3/2004 | Ferencz et al. | |
| 9,315,704 B2 * | 4/2016 | Li | C09J 191/00 |
| 2002/0188056 A1 | 12/2002 | Wool et al. | |

FOREIGN PATENT DOCUMENTS

| | | |
|---|---|---|
| WO | WO 2001/037991 | 5/2001 |
| WO | WO 2008/144703 | 11/2008 |
| WO | WO 2012/024301 | 2/2012 |

OTHER PUBLICATIONS

Baumann et al., "Natural Fats and Oils—Renewable Raw Materials for the Chemical Industry," *Angew. Chem. Int. Ed. Engl.* 27:41-62, 1988.

Biermann et al., "New Syntheses with Oils and Fats as Renewable Raw Materials for the Chemical Industry," *Angew. Chem. Int. Ed.* 39:2206-2224, 2000.

International Search Report and Written Opinion of the International Searching Authority for International Application No. PCT/US2011/039450, dated Aug. 2, 2012.

Liu et al., "Solid freeform fabrication of epoxidized soybean oil/epoxy composite with bis or polyalkyleneamine curing agents," *Composites* Part A 38:87-93, 2007.

Meier et al., "Plant oil renewable resources as green alternatives in polymer science," *Chemical Society Reviews* 36:1788-1802, 2007 (Published online Jul. 23, 2007).

Merfeld et al., "Acid/epoxy reaction catalyst screening for low temperature (120° C.) powder coatings," *Progress in Organic Coatings* 52(2):98-109, Feb. 1, 2005.

Metzger et al., "Lipids as renewable resources: current state of chemical and biotechnological conversion and diversification," *Appl Microbiol Biotechnol* 71:13-22, 2006 (Published online Apr. 8, 2006).

Shogren et al., "Biodegradation Behavior of Some Vegetable Oil-based Polymers," *Journal of Polymers and the Environment* 12(3):173-178, 2004.

* cited by examiner

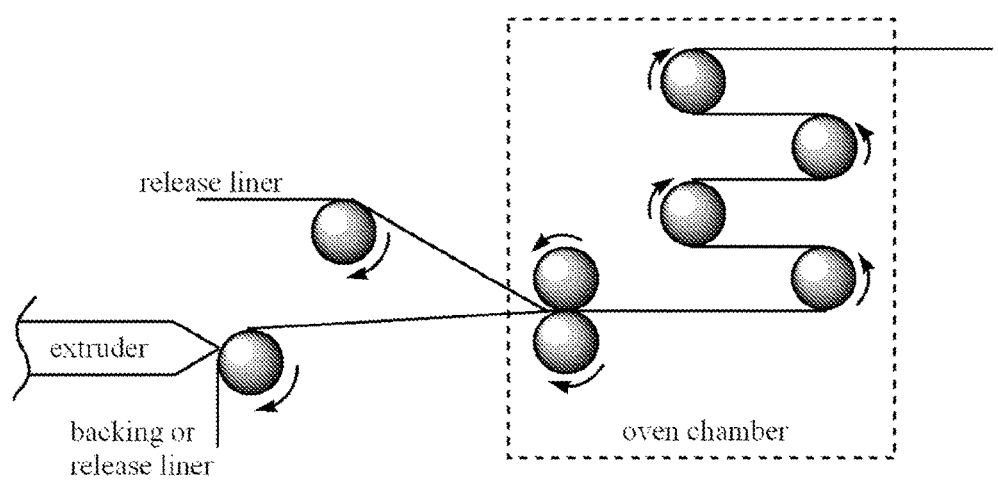

VEGETABLE OIL-BASED PRESSURE SENSITIVE ADHESIVES

CROSS REFERENCE TO RELATED APPLICATIONS

This is a continuation of U.S. application Ser. No. 13/701,782, filed Dec. 3, 2012, which is the U.S. National Stage of International Application No. PCT/US2011/039450, filed Jun. 7, 2011, which was published in English under PCT Article 21(2), which in turn claims priority to U.S. Provisional Application No. 61/352,691, filed Jun. 8, 2010, and U.S. Provisional Application No. 61/394,726, filed Oct. 19, 2010, which are incorporated herein in their entirety.

BACKGROUND

A pressure sensitive adhesive (PSA) (also known as "self adhesive" or "self stick adhesive") is an adhesive which forms a bond at room temperature with a variety of dissimilar surfaces when light pressure is applied. No solvent, heat or radiation is needed to activate the adhesive. It finds wide applications in pressure-sensitive tapes and/or foils, general purpose labels, note pads, automobile trim, packaging, medical, and a wide variety of other products.

Nowadays, most commercially available PSAs are derived from rubber, acrylic, modified acrylic, and silicone-based formulations, which are predominately made from petrochemical-based polymers. Given that petroleum and natural gas are depleting nonrenewable resources with naturally limited supply and increasing cost, it is desirable to provide PSA compositions that can be made from renewable natural materials. In addition, it is highly desirable that the manufacture and use of PSA do not generate environmental pollution.

Vegetable oils are one of the most abundant renewable materials. Approximately 20 billion pounds are produced annually in the United States. At present, less than 600 million pounds of soybean oil is used in industrial application. Therefore, there is plenty of soybean oil available for new industrial uses.

Vegetable oil is mainly a mixture of triglycerides with varying composition of long-chain saturated and unsaturated fatty acids depending on the plant, the crop, and the growing conditions. The double bonds in unsaturated fatty acids may be converted into more reactive oxirane moieties (the epoxy functional groups) by appropriate reactions. Epoxidized vegetable oils (EVOs) such as epoxidized soybean oil (ESO) are commercially available and are widely used in rubbers, plastics, resins, coatings, and various thermosetting composites.

The use of vegetable oils as starting materials for making PSAs has numerous advantages such as low cost, low toxicity, inherent biodegradability, and fairly high purity. Three general approaches for making PSAs from vegetable oils have been disclosed (see WO 2008/144703). In the first approach, free-radically polymerizable functional groups such as acrylate or methacrylate groups are first introduced onto fatty acid, fatty esters or vegetable oils and then polymerized via a free radical polymerization method such as ultraviolet radiation to form PSAs. The introduction of the functional groups is typically accomplished through the reaction between epoxidized fatty esters or epoxidized oils and acrylic acid/methacrylic acid. During the polymerization, various acrylic or methacrylic monomers may be used to co-polymerize with acrylated fatty esters/fatty acids/oils. In this approach, petrochemical-based acrylate is still used. This approach is considered as an extension of traditional free radical polymerization methods of making petrochemical-based PSAs. In the second approach, fatty ester or vegetable oils are first epoxidized. The epoxidized fatty esters or epoxidized vegetable oils are then polymerized to form PSAs through cationically catalyzed ring-opening polymerization of the epoxy rings. Some other epoxy compounds may be copolymerized with epoxidized fatty esters or epoxidized vegetable oils for improving the properties of PSAs. The third approach involves the direct polymerization of carbon-carbon double bonds on fatty acids, fatty esters or vegetable oils with other free-radically polymerizable compounds such as acrylate or methacrylate. Unlike those in drying oils such as Tung oil, most carbon-carbon double bonds in vegetable oils are not conjugated, thus having relatively low reactivity during the free radical polymerization. In this third approach, fatty acids, fatty esters or vegetable oils have to be modified to form conjugated double bonds before the free radical polymerization.

SUMMARY

Disclosed herein are pressure sensitive adhesive compositions, pressure sensitive adhesive constructs, methods for making pressure sensitive adhesive compositions and methods for making pressure sensitive adhesive constructs.

One embodiment disclosed herein is a pressure sensitive adhesive construct comprising:

(a) a backing substrate; and (a) a pressure sensitive adhesive composition disposed on the backing substrate, wherein the pressure sensitive adhesive composition includes a product made from at least one epoxidized vegetable oil and at least one dibasic acid or anhydride thereof, or a combination of a dibasic acid or anhydride thereof and a monobasic acid or anhydride thereof.

A further embodiment disclosed herein is a pressure sensitive adhesive construct comprising:

(a) a backing substrate; and (b) a pressure sensitive adhesive composition disposed on the backing substrate, wherein the pressure sensitive adhesive composition comprises a polyester condensation product that includes an epoxidized vegetable oil component crosslinked with at least one dibasic acid or anhydride thereof, or a combination of a dibasic acid or anhydride thereof and a monobasic acid or anhydride thereof.

An additional embodiment disclosed herein is a method for making a pressure sensitive adhesive construct comprising:

reacting at least one epoxidized vegetable oil with at least one dibasic acid or anhydride thereof, or a combination of a dibasic acid or anhydride thereof and a monobasic acid or anhydride thereof; and forming on a backing substrate a pressure sensitive adhesive from the resulting reaction product.

Another embodiment disclosed herein is a method for making a pressure sensitive adhesive composition comprising:

(a) reacting at least one epoxidized vegetable oil with at least one monobasic acid or anhydride thereof resulting in a modified epoxidized vegetable oil; and (b) reacting the modified epoxidized vegetable oil with at least one dibasic acid or anhydride thereof to produce a pressure sensitive adhesive composition.

Also disclosed herein is a method for making a pressure sensitive adhesive composition comprising:

reacting at least one epoxidized vegetable oil with at least one dibasic acid or anhydride thereof, or a combination of a dibasic acid or anhydride thereof and a monobasic acid or anhydride thereof to produce a pressure sensitive adhesive composition, wherein the amount of dibasic acid or anhydride reacted with the epoxidized vegetable oil is in a molar ratio of dibasic acid carboxyl groups to epoxidized vegetable oil epoxy groups of from 3:1 to 1:3.

BRIEF DESCRIPTION OF THE DRAWINGS

FIG. 1 illustrates a combination of reactive extrusion and reactive calendar for the preparation of PSA and PSA tapes as disclosed herein.

DETAILED DESCRIPTION

As used herein, the singular terms "a," "an," and "the" include plural referents unless context clearly indicates otherwise. Also, as used herein, the term "comprises" means "includes."

The term "aliphatic" is defined as including alkyl, alkenyl, alkynyl, halogenated alkyl and cycloalkyl groups as described above. A "lower aliphatic" group is a branched or unbranched aliphatic group having from 1 to 10 carbon atoms.

The term "alkyl" refers to a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is a saturated branched or unbranched hydrocarbon having from 1 to 10 carbon atoms. Preferred alkyl groups have 1 to 4 carbon atoms. Alkyl groups may be "substituted alkyls" wherein one or more hydrogen atoms are substituted with a substituent such as halogen, cycloalkyl, alkoxy, amino, hydroxyl, aryl, or carboxyl.

The term "aryl" refers to any carbon-based aromatic group including, but not limited to, benzene, naphthalene, etc. The term "aryl" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorous. The aryl group can be substituted with one or more groups including, but not limited to, alkyl, alkynyl, alkenyl, aryl, halide, nitro, amino, ester, ketone, aldehyde, hydroxy, carboxylic acid, or alkoxy, or the aryl group can be unsubstituted.

The term "cycloalkyl" refers to a non-aromatic carbon-based ring composed of at least three carbon atoms. Examples of cycloalkyl groups include, but are not limited to, cyclopropyl, cyclobutyl, cyclopentyl, cyclohexyl, and the like. The term "heterocycloalkyl group" is a cycloalkyl group as defined above where at least one of the carbon atoms of the ring is substituted with a heteroatom such as, but not limited to, nitrogen, oxygen, sulfur, or phosphorous.

Disclosed herein are new PSA compositions based on epoxidized vegetable oils (EVOs), and methods for the preparation of PSA formulations and PSA tapes and/or foils thereof. In general, an EVO is reacted with a dibasic carboxylic acid or a combination of a monobasic carboxylic acid and a dibasic carboxylic acid resulting in a PSA.

In one embodiment the PSA compositions include a polyester condensation product prepared at elevated temperatures of at least one EVO and at least one dibasic acid or its anhydride derivative, and optionally at least one monobasic acid or its anhydride derivative.

Certain embodiments of the PSA adhesive compositions disclosed herein exhibit adhesiveness or tackiness at room temperature, are odorless, are not made with organic solvents and/or toxic catalysts, consist of only renewable materials, and/or are thermally curable.

The EVO may be made from a vegetable oil by converting at least a portion of vegetable oil's double bonds into more reactive oxirane moieties. In particular embodiments, "EVO" generally refers to any derivative of vegetable oils whose double bonds are fully or partly epoxidized using any method, e.g. so called in situ performic acid process, which is the most widely applied process in industry. Herein, "vegetable oil" refers to a group of polyunsaturated triglycerides, which are composed of three fatty acids connected to a glycerol molecule. Typically, the fatty acids are long chain (C12 to C24 or even longer) materials with multiple double bonds per chain. The vegetable oil can be palm oil, olive oil, canola oil, corn oil, cottonseed oil, soybean oil, linseed oil, rapeseed oil, castor oil, coconut oil, palm kernel oil, rice bran oil, safflower oil, sesame oil, sunflower oil, or other polyunsaturated vegetable oils (both naturally existing and genetically modified), or mixtures thereof. In certain embodiments, more than one EVO can be utilized in a single mixture if desired. EVOs generally have a functionality (including epoxy groups and possibly hydroxyl groups thereof) well above two, which can result in polymers with fairly high density of cross-linking when polymerized with dibasic acids, and therefore increase the modulus of the polymers and decrease their utility as PSAs. Therefore, in some embodiments, modifications of the composition are performed and/or reaction conditions are optimized to obtain polyesters with appropriate density of cross-linking which are appropriate for PSA compositions. EVOs such as ESO and epoxidized linseed oil are also readily available from commercial suppliers such as Spectrum Chemical Mfg Corp, California, and Sigma-Aldrich Corp, Missouri.

The EVO may contain about 1.5 to about 6 epoxy groups (or even more) per triglyceride. It is preferred that the EVO contain functionality (epoxy number) of 2 to 5, more preferably 2.5 to 4.5. The epoxy functionality of EVO can be controlled by epoxidizing less than all of the double bonds of the starting vegetable oils. Or, according to particular embodiments, the EVOs with high functionality used in the present PSA compositions may optionally be modified by reacting with at least one monobasic acid or its anhydride derivatives ("modifier"), to lower their epoxy functionality, and to reduce the rate and density of cross-linking in the following polymerization with dibasic acids as described below in more detail. The epoxy functionality of EVO (or modified EVO) determines the rate and density of cross-linking in the polymerizations of EVO and dibasic acids. The use and amount of a modifier and the choices of the polymerization temperature and time are also among the factors that eventually determine the properties of the PSAs.

In particular embodiments, the dibasic acids used in the preparation of the PSAs may include any organic compounds that contain two carboxylic acid functional groups, and derivatives or analogs thereof. The following are also considered to be dibasic acids from the viewpoint of polycondensation chemistry: tribasic or higher H-functionality acids; and compounds that include two or more displaceable active hydrogen atoms per molecule but the hydrogen atoms are not part of a carboxyl moiety. More than one dibasic acid can be utilized in a single mixture if desired. Dibasic acids can be aliphatic (linear, branch or cyclic) saturated carboxylic acids containing up to 30 carbon atoms, preferably 3 to 22 carbon atoms, e.g., malonic acid, succinic acid, glutaric acid, adipic acid, pimelic acid, suberic acid, azelaic acid, sebacic acid, and brassylic acid. Dibasic acids may also be aromatic acids and derivatives thereof, including without limitation, phthalic acid, isophthalic acid and terephthalic acid. Dibasic acid can also be produced from other derivatives such as anhydrides. Specific examples include without limitation succinic anhydride and phthalic anhydride. The dibasic acids or anhydride derivatives are preferably derived from natural resources. In addition to the high energy-consuming traditional processes for the production of dibasic acids, alternative accesses to various dibasic acids from renewable feedstocks have been well reported (see, e.g, "Lipids as renewable resources: current state of chemical and biotechnological conversion and diversification" by J. O. Metzger and U. Bornscheuer (*Appl. Microbiol. Biotechnol.* 2006)).

The monobasic acid which may form a part of the PSA compositions (e.g, as a "modifier" in certain embodiments) may be any of the organic compounds that contain only one carboxyl group, e.g., free acids or derivatives thereof. More than one monobasic acid can be utilized in a single mixture if desired. The monobasic acid can be an aliphatic (linear, branch or cyclic) saturated acid containing up to 36 carbon atoms, preferably 1 to 24 carbon atoms, e.g. formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, and lignoceric acid. The monobasic acid can also be aromatic acids and derivatives thereof, such as benzoic acid, naphthalene acid, and derivatives thereof. As is understood by those of ordinary skills in the art, monobasic acid can also be produced from other derivatives such as anhydrides. Specific examples include without limitation, acetic anhydride and propionic anhydride. The monobasic acid is preferably derived from natural resources. For example, free fatty acid can be obtained by hydrolysis of natural fats and oils derived from plant or animal sources. In this connection, mixtures of free fatty acids or their esters may also be utilized as starting materials for the sake of cost effectiveness, although the saturated fatty acids are preferred.

In particular embodiments, in addition to the EVO, dibasic acid and/or monobasic acid, the reaction mixture can also contain from about 0.05 to 10.0, more particularly 0.1 to 10.0, parts by weight of a catalyst, preferably from about 0.1 to 2 parts by weight, based on the weight of the reactants, especially when the reaction is performed at low temperatures (e.g., <120° C.). The catalyst can reduce the cure time (e.g., a cure time of 3 to 6 minutes) of the reaction mixture. Several catalysts can be used to effectively catalyze the reaction between carboxyl groups and epoxy groups. These catalysts can be:

(1) amines, especially tertiary amines, —examples include but are not limited to, triethylamine, trimethylamine, tri-n-pentylamine, trioctylamine, tridecylamine, tridodecylamine, trieicosylamine, docosyldioctylamine, triacontyldibutylamine, 2-ethylhexyl di-n-propylamine, isopropyl di-n-dodecylamine, isobutyl di-n-eicosylamine, 2-methyldocosyl di-(2-ethylhexyl) amine, triacontyl di-(2-butyldecyl) amine, n-octadecyl di-(n-butyl)amine, n-eicosyl di-(n-decyl)amine, n-triacontyl n-dodecylmethylamine, n-octyldimethylamine, n-decyldiethylamine n-dodecyldiethylamine, n-octadecyldimethylamine, n-eicosyl dimethylamine, n-octyl n-dodecylmethylamine, n-decyl n-eicosylethylamine, n-octyldimethylamine, n-decyldimethylamine, n-dodecyldimethylamine, n-tetradecyldimethylamine, n-hexadecyldimethylamine, n-octadecyldimethylamine, n-eicosyldimethylamine, di-(n-octyl)methylamine, di-(n-decyl)methylamine, di-(n-dodecyl)methylamine, di-(n-tetradecyl)methylamine, di-(n-hexadecyl)methylamine, di-(n-octadecyl)methylamine, di-(n-eicosyl)methylamine, n-octyl n-dodecylmethylamine, n-decyl n-octadecylmethylamine, dimethylbenzylamine, N,N-dimethylaniline, N,N-dimethylaniline, N-methyldiphenylamine, triphenylamine, N-methyl-N-dodecylaniline pyridine, 2-methylpyridine, triethanolamine, N-methylmorpholine, N-methylpiperidine, N-ethylpiperidine, N,N-dimethylpiperazine, 1-methyl imidazole, 1-butylimidazole, 1,8-diazabicyclo[5.4.0]undec-7-ene, 1,5-diazabicyclo[5.4.0]undec-5-ene, 1,5-diazabicyclo [4.3.0]non-5-ene, 1,4-diazobicyclo[2.2.2]-octane, tetramethyl guanidine, N,N,N',N'-tetramethyl-1,8-diaminonaphthalene, 2-phenyl-2-imidazoline, 2-ethylimidazole, bis(2-ethylhexyl)amine, etc;

(2) metal salts or complexes (e.g., alkali metal salts of weak organic acid)—examples include but are not limited to, chromium (III) tris(acetylacetonate), chromium (III) 2-ethylhexanoate, chromium (III) hexanoate, chromium (III) octoate, chromium (III) stearate, chromium (III) naphthenate, 3,5-diisopropylsalicylato chromium (III) chelate, bis(3, 5-diisopropylsalicylato)-monohydroxy chromium (III) chelate, zinc acetate, zinc acetate dihydrate, zinc acetylacetonate, zinc octoate, zinc laurate, zinc salicylate, zinc glycinate, zinc gluconate, zinc oleoylsarcosinoate, zinc naphthenate, zinc 2-ethylhexyl acid phosphate salt, zinc butyl acid phosphate salt, zinc di-2-ethylhexyldithio-phosphate, zinc salt of dodecenyl succinate butyl half ester, N-butylsalicylaldimio zinc (II) chelate, zinc isovalerate, zinc succinate, zinc dibutyl dithiocarbamate, stannous octoate, stannum (II) 2-ethylhexyl acid phosphate salt, titanium ethyl acetoacetate chelate, titanium acetoacetate chelate, titanium triethanolamine chelate, zirconium octoate, zirconium 6-methylhexanedione, zirconium (IV) trifluoroacetylacetone, 3,5-diisopropylsalicylato nickel (II) chelate, nickel acetylacetonate, N-butylsalicylaldimio nickel (II) chelate, 3,5-diisopropylsalicylato manganese (II) chelate, manganese naphthenate, manganese naphthenate, magnesium 2,4-pentadionate, iron octoate, ferric linoleate, iron (III) acetylacetonate, cobalt octoate, cobalt naphthenate, cobalt (III) acetylacetonate, N-butylsalicylaldimio cobalt (II) chelate, N-butylsalicylaldimio cobalt (III) chelate, 3,5-diisopropylsalicylato cobalt (II) chelate, N-butylsalicylaldimio copper (II) chelate, 3,5-diisopropylsalicylato copper (II) chelate, 3,5-diisopropylsalicylato oxyvanadium (IV) chelate, aluminum acetylacetonate, aluminum lactate, dibutyltin dilaurate, dibutyltin oxide, butylchloro tin dihydroxide, cerium naphthenate, calcium octoate, bismuth octoate, lithium acetate, sodium acetate, potassium acetate, etc;

(3) quaternary ammonium compounds, —examples include but are not limited to, tetrabutyl ammonium bromide, tetrabutyl ammonium iodide, tetrabutyl ammonium hydrogen sulphate, tetrabutyl ammonium fluoride, tetrabutyl ammonium chloride, tetraethyl ammonium bromide, tetraethylammonium iodide, tetrapropylammonium bromide, tetrapropyl ammonium iodide, tetramethyl ammonium chloride, tetramethylammonium bromide, tetramethyl ammonium iodide, tetraoctyl ammonium bromide, benzyltriethyl ammonium chloride, benzyltributyl ammonium chloride, benzyltrimethyl ammonium chloride, benzyltrimethylammonium bromide, butyltriethyl ammonium bromide, methyltrioctyl ammonium chloride, methyltricapryl ammonium chloride, methyltributyl ammonium chloride, methyltributyl ammonium bromide, methyltriethyl ammonium chloride, myristyltrimethyl ammonium bromide, tetradecyltrimethyl ammonium bromide, cetyltrimethyl (or hexadecyltrimethyl) ammonium bromide, hexadectyltrimethyl ammonium bromide, cetyltrimethylammonium chloride, hexadectyltrimethyl ammonium chloride, lauryltrimethyl ammonium chloride, dodecyltrimethyl ammonium chloride, phenyltrimethyl ammonium chloride, benzalkonium chloride, cetyldimethylbenzyl ammonium bromide, cetalkonium bromide, cetyldimethylbenzyl ammonium chloride, cetalkonium chloride, tetrabutyl ammonium perchlorate, tetrabutyl ammonium p-toluene sulfonate, tetraethyl ammonium p-toluene sulfonate, cetyltrimethyl ammonium p-toluene sulfonate, tetraethyl ammonium tosylate, tetrabutyl ammonium tosylate, cetyltrimethyl ammonium tosylate, phenyltrimethyl ammonium bromide, benzyltrimethyl ammonium hydroxide, tetrabutyl ammonium hydroxide, tetramethyl ammonium hydroxide, etc;

(4) quaternary phosphonium compounds, —examples include but are not limited to, tetrabutyl phosphonium bromide, ethyltriphenyl phosphonium iodide, ethyltriphenyl phosphonium bromide, ethyltriphenyl phosphonium iodide, butyltriphenyl phosphonium bromide, benzyltriphenyl phosphonium chloride, methyltriphenyl phosphonium bromide, methyltriphenyl phosphonium iodide, tetraphenyl phosphonium bromide, triphenyl phosphonium bromide, methyltriphenyl phosphonium chloride, butyl triphenyl phosphonium chloride, (methoxy methyl)triphenyl phosphonium chloride, etc;

(5) phosphines, such as triphenylphosphine, etc;

(6) alkali metal hydroxide, e.g. potassium hydroxide, sodium hydroxide, etc.

The catalyst may be added at any point during the prepolymerization from the initial charge until the coating of the reaction mixtures. In certain embodiments, it is important that the catalyst be added when the catalyst can be homogeneously distributed.

The PSA compositions may also include additives and fillers. Fillers may either originally occur in the starting materials such as esters of fatty acids, or be included on purpose. Additives such as tackifiers, colored pigments, opacifiers, processing oil plasticizers, solvents and other constituents known to the tape art may be incorporated in the PSAs.

In certain embodiment, the polyester condensation product disclosed herein is the majority component of the pressure sensitive adhesive composition meaning the pressure sensitive adhesive composition includes at least about 50, particularly at least about 70, more particularly at least about 80, and most particularly at least about 90, weight percent of the polyester condensation product based on the total weight of the pressure sensitive adhesive composition.

The reaction (e.g., polymerization) of EVO with dibasic acid and optionally monobasic acid may be accomplished by heating a reaction mixture of EVO and dibasic acid or its anhydride derivative, or a combination of dibasic acid or its anhydride derivative and a monobasic acid or its anhydride derivative, under controlled conditions (especially reaction temperature and time), to a degree that cross-linking does not obviously occur, and the viscosity of the intermediate reaction mixture is appropriate to allow blade-coating. If desired, the reaction is preferably carried out under an inert atmosphere free from oxygen, e.g. under nitrogen, since the esters are easily oxidized at high temperature to give dark-colored products. The polymerization compositions can be considered as a two-part system in which the EVO component (either unmodified or modified with a monobasic acid) comprises one part (component a) and the at least one dibasic acid (and optionally at least one monobasic acid) comprises the second part (component b). The two parts can be mixed together in three methods: (1) the two parts are mixed together at room temperature prior to heating; (2) component a in melt or liquid state is mixed together with component b in solid state at room temperature, prior to heating together; (3) both component a and b are in melt or liquid state, prior to mixing and heating.

According to some particular embodiments, the novel EVO-based PSA compositions may be prepared by heating the reaction mixture at a temperature suitably in the range from 80 to 300° C. for 1 to 20 minutes, preferably from 100 to 220° C. for 3 to 10 minutes, and more particularly from 130 to 180° C. for 4 to 6 minutes. The compositions may have an open time of up to about 5 or 25 minutes, depending on the nature of the dibasic acid, the functionality of EVO, mixing methods, reaction temperature, and the nature and amount of catalysts (as described above). As used herein, "open time" denotes the time from mixing of the two parts to the time at which cross-linking takes place to a point that the mixed composition can no longer be applied. Generally, the higher the reaction temperature, the shorter the open time. At lower temperature, the carboxylic acid groups are mainly consumed by epoxy groups. But at higher temperature, both epoxy groups and hydroxyl groups derived from carboxyl-epoxy reaction may react with carboxylic acid groups. As the reaction proceeds further, the carboxylic acid-hydroxyl esterification reaction dominates the reaction, with the result that the density of cross-linking increases and the mixed composition becomes more difficult for coating and less appropriate for PSAs. The reaction can be controlled to generate coatings with low glass transition temperature, sufficient cohesive strength, and good initial tack and adhesive powder which are appropriate for PSA.

In typical EVO-based PSA compositions disclosed herein, dibasic acid (or an anhydride thereof) can be used in molar ratios of carboxyl groups to EVO epoxy groups (or modified EVO) of from about 3:1 to about 1:3. However, excess carboxyl groups are preferably desired in the reaction mixture, so as to help control the rate and density of cross-linking and promote the adhesive power of the final polyester products. More particularly, the amount of dibasic acid used to make the PSA compositions is preferably such as to provide a 5 to 80 mol % excess of carboxyl groups over that required to esterify all the epoxy groups present in the reaction mixture.

In certain embodiments, an initial or first-stage polymerization is accomplished by heating the reaction mixture only to the extent that cross-linking does not obviously occur, and the viscosity of the first-stage reaction mixture is sufficiently low to allow blade-coating of the reaction mixture onto PSA backing materials or release liners (e.g., siliconized release liners). The PSA backing materials can be paper, cellophane, plastic film, cloth, tape or metal foils.

The resulting prepolymer coatings on the backings are then heated such as in an air-circulating oven so that appropriate cross-linking of the polyesters can take place to give a "dry" adhesive layer of sufficient cohesion strength, good initial tack and adhesive power that are appropriate for PSA applications.

According to particular embodiments, the homogenous mixtures can be blade-coated within the open time on PSA backing substrates (such as Kraft paper and PET film) or siliconized release liners with a glass bar immediately after heating of the mixed compositions, with the result that a thin, uniform layer of the mixed compositions is produced on the backing or liner at a coating level of about 2 to about 10 mg/cm². It should be noted herein that, the "monomer" reaction mixtures (EVOs and dibasic acids) per se are generally of low viscosity, and may be too low in fact to be handled conveniently. In order to increase their viscosity to a more desirable level, the "monomer" reaction mixtures are partially polymerized prior to coating to a desirable degree such that a fairly high conversion of the dibasic acid is reached but cross-linking does not obviously occur, thus forming a clear "syrup" of appropriate viscosity.

According to some particular embodiments, the resulting adhesive coatings on the PSA backings are then subjected to heat such as in an air-circulating oven maintained at 100-300° C. for 8 to 100 minutes (more particularly 10 to 100 minutes), preferably at 120-250° C. for 30 seconds to 80 minutes, and more particularly at 150-200° C. for 1 to 60 minutes, so that appropriate cross-linking of the polyesters can take place to give a "dry" adhesive layer of sufficient cohesion strength, good initial tack and adhesive power that are appropriate for PSAs. Generally, the higher the reaction temperature the shorter the duration of heating is needed to accomplish the polymerization to an ideal degree. However, before choosing the oven temperature, the heat stability of the PSA backing or siliconized release liners should be considered.

Although not bound by any theory, it is assumed that, due to the action of heat, the reactive groups (carboxylic acid groups, and epoxy groups and/or hydroxyl groups) which are still present in the pre-polymers on the PSA backing, are activated to such an extent that they are capable of further polymerization and cross-linking. For PSA applications, cross-linking is desirable, particularly where it is desired to increase the cohesive strength of the adhesive without unduly affecting its compliance. However, too high density of cross-linking can be deleterious to the PSA properties, with a severe loss of compliance as reflected in the peel test. Therefore, the reaction temperature and time at this stage may be finely tuned for appropriate cross-linking of the PSA systems.

Also disclosed herein are new PSA compositions based on modified EVOs, and methods for the preparation of said PSA formulations and PSA tapes and/or foils thereof. In this embodiment, the PSA compositions include a polyester condensation product prepared at elevated temperatures of modified EVO and at least one dibasic acid or its anhydride derivative, wherein the modified EVO was made by reacting at least one EVO and at least one monobasic acid or its anhydride derivative at elevated temperatures. It should be noted herein that, such modification at the same time increases the hydrophilicity of EVO due to introduction of hydroxyl groups, which facilitates the reaction between EVO and dibasic acids, and improves coating "wet-out" of the reaction mixture to tape backings such as paper.

The novel EVO-based PSAs may be prepared by mixing (by any mixing methods described above) and heating modified EVO and at least one dibasic acid or its anhydride derivative, or a combination of dibasic acid or its anhydride derivative and a monobasic acid or its anhydride derivative. Modified EVO is previously prepared by reacting EVO with at least one monobasic acid or its anhydride derivatives, and catalysts (as described above) if needed, at a temperature suitably in the range from 80 to 300° C. for 10 seconds to 300 minutes, preferably from 100 to 220° C. for 30 seconds to 200 minutes, more particularly from 120 to 180° C. for 1 to 120 minutes. Generally, at this stage of modification of EVO, no cross-linking reaction occurs, regardless of the reaction temperature and reaction time. The higher the reaction temperature, the shorter the duration of heating needed to accomplish the modification. At a lower temperature, the carboxylic acid groups are mainly consumed by epoxy groups, but at higher temperature, hydroxyl groups derived from carboxylic acid-epoxy reaction may react with carboxylic acid groups. According to particular embodiments, the amount of monobasic acid used in the present PSA compositions to react with EVO is preferably such as to leave about 1.5 to about 6 moles, more preferably about 2 to about 5 moles, more particularly about 2.5 to about 4.5 moles of epoxy groups, in one mole of modified EVO.

The modified EVO so formed is then further mixed (by any mixing methods described above) and reacted with at least one dibasic acid or its anhydride derivative, or a combination of dibasic acid or its anhydride derivative and a monobasic acid or its anhydride derivative, and catalysts (as described above) if needed, at a temperature suitably in the range from 80 to 300° C. for 10 seconds to 50 minutes, preferably from 100 to 220° C. for 30 seconds to 30 minutes, and more particularly from 130 to 180° C. for 1 to 20 minutes. The mixed compositions may have an open time of up to about 10 or 60 minutes, depending on the nature of dibasic acid, functionality of the modified EVO, mixing method, reaction temperature, and the nature and amount of catalysts (as described above).

In another embodiment, the prepolymer coatings on the release liners are covered with a sheet of backing material, resulting in a sandwich assembly which is then pressed (e.g., with a rubber roller) to achieve sufficient wet-out of the adhesive onto the PSA backing. Subsequently, the release liner is removed from the sandwich assembly, with the adhesive transferring onto the PSA backing. The resulting adhesive coatings on the backing are then heated such as in an air-circulating oven so that appropriate cross-linking of the polyesters can take place to give a dry adhesive layer of sufficient cohesion strength, good initial tack and adhesive power that are appropriate for PSA. Alternatively, the sandwich assembly as a whole may be heated to crosslink the polyester and then the release liner may be removed.

It should be noted that, the coating layer on the backing substrate after heating might not have a good appearance, with blotches of no or little adhesive on the PSA backing, probably due to retraction of the adhesive during polymerization and cross-linking. The novel process described above was developed to address this issue. As described above, the reaction mixture immediately after the pre-polymerization is initially blade-coated on the siliconized face of siliconized release liners. The resulting adhesive coatings on the siliconized release liners are then covered with a sheet of PSA backing material, resulting in the sandwich assembly.

In still another embodiment, the preparation of a PSA composition and PSA tapes comprising the composition could be performed with the aid of two siliconized release liners with different adhesion-repellence abilities to the adhesive composition. The reaction mixture immediately after the pre-polymerization is initially blade-coated on the siliconized face of a sheet of partially siliconized release liner. A "partially" siliconized release liner means that only a portion of the release liner surface is covered by a silicone agent. A "fully" siliconized release liner means that substantially all of the release liner surface is covered by a silicone agent. The resulting adhesive coating is then covered (the siliconized face inwardly) with a sheet of fully siliconized release liner, resulting in a sandwich assembly which is pressed (e.g., with a rubber roller) to achieve a good contact between the adhesive composition and the two liners. The sandwich assembly is then heated such as in an air-circulating oven so that appropriate cross-linking of the polyesters can take place to give a dry adhesive layer of sufficient cohesion strength, good initial tack and adhesive power that are appropriate for PSA. Afterwards, the fully siliconized release liner is quickly peeled off without taking away any adhesive composition, after which a sheet of backing material such as paper is immediately and carefully covered on the adhesive layer. The new "sandwich" is then pressed (e.g., with a rubber roller) to achieve sufficient wet-out of the adhesive onto the paper backing in order to provide adequate adhesion. After the sandwich assembly is cooled down, the partially siliconized release liner could be easily peeled off with the adhesive composition completely transferring to the paper backing. In this embodiment, a first release liner such as, for example, the partially siliconized release liner has an adhesion-repellence that is less than the adhesion-repellence of a second release liner such as, for example, the fully siliconized release liner. In other words, the second release liner can be more easily removed than the first release liner meaning that one release liner can be removed while the PSA composition still adheres to another release liner. The siliconized released liner can be optionally left for protection of the adhesive layers on the paper backing. One of the advantages for this method is that low molecular weight starting materials for making the PSA composition do not penetrate the paper backing to give oily or dirty appearance of the resulting PSA tape.

According to particular embodiments, the present PSAs may be used to manufacture many different types of PSA tapes. Thus, various flexible tape backings and liners may be used, including films (transparent and non-transparent), plastics such as PET film or modified natural substances such as cellophane, cloths, papers, non-woven fibrous constructions, metal foils, metalized plastics foils, aligned filaments, etc.

The adhesive layers can be covered with papers or films which contain an adhesive-repellent layer, e.g. a separating layer consisting of silicone, for the protection of the adhesive layers on the PSA backings. The back side of the PSA films, tapes or foils can be coated with an adhesive-repellent coating (e.g. silicone coating) for facilitating rolling off the PSA.

In still another embodiment, the preparation of the PSA and PSA tapes thereof as disclosed herein could be continuously performed using a combination of reactive extrusion and reactive calendaring, which is illustrated in FIG. 1. The reactive calendaring setup is a device that includes a series of rollers placed in an oven chamber. In one embodiment, the rollers may be unheated and disposed of inside an oven chamber at a preset temperature. In another embodiment, heated rollers can be used and the whole calendaring setup does not need to be housed in an oven chamber.

As shown in FIG. 1, the prepolymerization is done continuously using reactive extrusion in a mono- or twin-screw extruder. The hot prepolymer from the extruder is thereupon coated on a backing material (such as film or paper, et al) or a release liner, which is then laminated with another release liner with different adhesion abilities to the adhesive composition, to give a sandwich assembly. Afterwards, the sandwich assembly is directed to heated calendar rollers or calendar rolls placed in an oven chamber at a preset temperature. The duration of the process can be fine-tuned by adjusting the number and sizes of the rolls or the travel distance of the assembly inside the oven chamber, so that appropriate cross-linking of the polyesters can take place to give a dry adhesive layer of sufficient cohesion strength, good initial tack and adhesive power that are appropriate for PSA.

The vegetable oil-based PSA compositions and the method of making them are attractive from both the commercial and environmental perspectives. The advantages of these novel PSAs include without limitation:

(1) the starting materials can all be derived from naturally abundant and renewable resources, providing an alternative to petrochemical-based PSAs;

(2) the products are biodegradable, thus alleviating environmental pollution by used PSA-containing products;

(3) The composition is relatively simple and all ingredients are inexpensive, non-toxic and environmentally friendly. Additives that are commonly used in many petrochemical-based PSAs such as tackifiers and waxes may not be needed; and (4) The processes of making the PSAs are short and simple, thus facilitating a large scale production with low energy consumption. PSAs can be made without use of any organic solvent or hazardous expensive catalysts. The whole processes are very environmentally friendly.

Example 1

This example describes the preparation of a PSA composition from ESO and adipic acid in a molar ratio of 1:1 oxirane group to carboxylic acid group and of PSA tapes comprising the composition. ESO (2.88 g, containing about 12.6 mmol of oxirane groups) and adipic acid (0.93 g, containing 12.7 mmol of carboxylic acid groups) were charged to a 50-mL round-bottom flask equipped with a heating mantle and a magnetic stirring. The mixture was then heated at 180° C. with stirring. After the mixture became clear and colorless, the heating was continued for another three minutes at the same temperature to give a pale greenish-yellow, viscous "syrup". The flask was then taken out of the mantle, and the syrup was quickly blade-coated on a sheet of white kraft paper with a glass rod at a coating level of about 8 mg/cm$^2$, to give a thin, continuous, uniform layer of sticky, long-fiber-forming, "wet" coating. Subsequently, the paper coated with the adhesive layer was placed in an air-circulating oven maintained at 160° C. The heat caused the cross-linking reaction of the coating composition. After 35 minutes in the oven, the coating became a clear, pale greenish-yellow, "dry" adhesive layer of sufficient cohesion. Some blotches of no or little adhesive on the paper backing were noticeable probably due to retraction of the adhesive during polymerization and cross-linking. The finished PSA tape thus obtained possessed good initial tack, formed ropy structure upon its removal from surfaces (e.g. metal, lacquer, glass, human skin) to which they are applied, and exhibited a good adhesive power of about 1.6 lbf/inch on stainless steel (type 302). The 90° peel adhesion test method and conditions are described in Example 2; the sample tape was almost cleanly removed in the test, leaving only a little adhesive residue on the panel.

Example 2

This example describes 90° peel adhesion test on stainless steel for the sample tapes. The measure of bond strength between an adhesive and a substrate is defined as adhesion. Adhesion properties are typically tested using the 90° peel adhesion test method by measuring the force required to remove the pressure-sensitive material from a stainless steel, at a specified angle of 90°, and at a specified speed. An exemplary 90° peel adhesion test of sample tapes on a stainless steel test panel (type 302 stainless steel) consists of following steps:

(1) Clean the stainless steel test panel (2" wide by 6" long) twice with Kimwipe napkin and acetone, and condition the panel for about 15 minutes before applying the tape onto the panel.
(2) Randomly cut 5 strip specimens from each PSA-coated sample sheet. The specimen size is 1" wide by 6" long.
(3) The specimen tape was laid onto the stainless steel panel with the adhesive side down against the stainless steel test panel, and pressed by two passes of a 4.5-pound hard rubber roller in the direction parallel to the panel length, to achieve sufficient wet-out onto the panel surface in order to provide adequate adhesion.
(4) Let the pasted specimen tapes dwell for 20 minutes prior to testing.
(5) Set up and calibrate the Instron 5582 testing machine in accordance with the manufacture instructions. A five-pound load cell was used, and the test speed was set at 12 inches per minute.
(6) Place the tested specimen onto the upper jaw of the Instron machine, and start testing. While the upper jaw was moving up, the panel was passively moved in the horizontal direction along the holder so that the specimen tape maintained a peel angle of 90° throughout the test.
(7) The force opposing that movement is automatically recorded as average load in pounds.
(8) Repeat the above steps to test the rest of the specimens (typically, five specimens were selected for each sample tape) and average the results.

Example 3

This example describes the preparation of a PSA composition from ESO and adipic acid in a molar ratio of 1:1.35 oxirane groups to carboxylic acid groups) and of PSA tapes comprising the composition. ESO (2.69 g, containing about 11.8 mmol of oxirane groups) and adipic acid (1.16 g, containing 15.9 mmol of carboxyl groups) were charged to a 50-mL, round-bottom flask equipped with a heating mantle and a magnetic stirrer. The mixture was heated by the preheated mantle (180° C.) with stirring. After the mixture became clear and colorless, the heating was continued for another four minutes at the same temperature to give a clear, pale greenish-yellow, viscous "syrup". The flask was then taken out of the mantle, and the syrup was quickly blade-coated on a sheet of white kraft paper with a glass rod at a coating level of about 10 mg/cm$^2$, to give a thin, continuous, uniform layer of sticky, long-fiber-forming, "wet" coating. Subsequently, the paper coated with the adhesive layer was placed in an air-circulating oven maintained at 160° C. The heat caused the cross-linking reaction of the coating composition. After 45 minutes, the coating became a clear, pale greenish-yellow, shiny, "dry" adhesive layer of sufficient cohesion strength, although some blotches of no or little adhesive on the paper backing were noticeable probably due to retraction of the adhesive during polymerization and cross-linking. The finished PSA tape thus obtained possessed good initial tack, formed ropy structure upon removal of it from surfaces (e.g. metal, lacquer, glass, human skin) to which they are applied, and exhibited a good adhesive power of about 3.1 lbf/inch on stainless steel (type 302). The 90° peel adhesion test method and conditions are described in Example 2; the sample tape was almost cleanly removed in the test, leaving only little adhesive residue on the panel.

Example 4

This example describes preparing a PSA composition from ESO and adipic acid in a molar ratio of 1:1.2 oxirane groups to carboxylic acid groups and PSA tapes comprising the composition. ESO (2.56 g, containing about 11.2 mmol of oxirane groups) and adipic acid (1.16 g, containing 13.7 mmol of carboxylic acid groups) were charged to a 50-mL, round-bottom flask equipped with a heating mantle and magnetic stirring. The mixture was heated by the preheated mantle (180° C.) with stirring. After the mixture turned clear and colorless, the heating was continued for another four minutes at the same temperature to give a clear, pale greenish-yellow, viscous "syrup". The flask was then taken out of the mantle, and the syrup was quickly blade-coated on a sheet of white kraft paper with a glass rod at a coating level of about 10 mg/cm$^2$, to give a thin, continuous, uniform layer of sticky, long-fiber-forming, "wet" coating. Subsequently, the paper coated with the adhesive layer was placed in an air-circulating oven maintained at 160° C. The heat caused the cross-linking reaction of the coating composition. After 30 minutes, the coating became a clear, pale greenish-yellow, shiny, "dry" adhesive layer of sufficient cohesion strength, although some blotches of no or little adhesive on the paper backing were noticeable probably due to retraction of the adhesive during polymerization and cross-linking. The finished PSA tape thus obtained possessed good initial tack, formed ropy structure upon removal of it from surfaces (e.g. metal, lacquer, glass, human skin) to which they are applied, and exhibited a good adhesive power of about 3.2 lbf/inch on stainless steel (type 302). The 90° peel adhesion test method and conditions are described in Example 2; the sample tape was almost cleanly removed in the test, leaving only a little adhesive residue on the panel.

Example 5

This example describes the preparation of a PSA composition from ESO and adipic acid in a molar ratio of 1.66:1 oxirane groups to carboxyl groups and of PSA tapes comprising the composition. ESO (3.26 g, containing about 14.3 mmol of oxirane groups) and adipic acid (0.63 g, containing 8.6 mmol of carboxyl groups) were charged to a 50-mL, round-bottom flask equipped with a heating mantle and a magnetic stirrer. The mixture was heated by a preheated mantle (180° C.) with stirring. After the mixture turned clear and colorless, the heating was continued for another four minutes at the same temperature to give a pale greenish-yellow, sort of turbid, viscous "syrup". The flask was then taken out of the mantle, and the syrup was quickly blade-coated on a sheet of white kraft paper with a glass rod at a coating level of about 6.8 mg/cm$^2$, to give a thin, continuous, uniform layer of pale greenish yellow, sort of sticky, short-fiber-forming, "wet" coating. Subsequently, the paper coated with the adhesive layer was placed in an air-circulating oven maintained at 160° C. The heat caused the cross-linking reaction of the coating composition. After 60 minutes, the coating became a clear, pale greenish-yellow, shiny, almost "dry" adhesive layer of fairly good cohesion strength, although some patches of no or little adhesive on the paper backing were noticeable probably due to retraction of the adhesive during polymerization and cross-linking. The finished PSA tape thus obtained possessed fairly good initial tack, formed ropy structure upon removal of it from surfaces (e.g. metal, lacquer, glass, human skin) to which they are applied, and exhibited an adhesive power of about 0.95 lbf/inch on stainless steel (type 302). The 90° peel adhesion test method and conditions are described in Example 2; the sample tape was almost cleanly removed in the test, leaving a little adhesive residue on the panel.

Example 6

This example describes the preparation of a PSA composition from ESO and adipic acid (in a molar ratio of 1:1 oxirane groups to carboxylic acid groups) and of PSA foils comprising the composition. ESO (2.23 g, containing about 9.8 mmol of oxirane groups) and adipic acid (0.72 g, containing 9.8 mmol of carboxylic acid groups) were charged to a 50-mL, round-bottom flask equipped with a heating mantle and a magnetic stirring. The mixture was heated by the preheated mantle (150° C.) with stirring. After the mixture turned clear and colorless, the heating was continued for another five minutes at the same temperature to give a clear, pale greenish-yellow, viscous "syrup". The flask was then taken out of the mantle, and the syrup was quickly blade-coated on a sheet of aluminum foil with a glass rod at a coating level of about 10 mg/cm$^2$, to give a thin, continuous, uniform layer of sticky, fiber-forming, "wet" coating. Subsequently, the foil coated with the adhesive layer was placed in an air-circulating oven maintained at 160° C. The heat caused the cross-linking reaction of the coating composition. After 70 minutes in the oven, the coating became a clear, pale greenish-yellow, shiny, "dry" adhesive layer of sufficient cohesion strength, although a small amount of blotches of no or little adhesive on the foil backing were still noticeable probably due to retraction of the adhesive during polymerization and cross-linking. The finished PSA foil thus obtained possessed fairly good initial tack, formed ropy structure upon its removal from surfaces (e.g. metal, lacquer, glass, human skin) to which they are applied, and exhibited a good adhesive power of about 1.5 lbf/inch on stainless steel (type 302). The 90° peel adhesion test method and conditions are described in Example 2; the sample tape was cleanly removed in the test, leaving no adhesive residue on the panel.

Example 7

This example describes the preparation of a PSA composition from ESO and sebacic acid (in a molar ratio of 1:1 oxirane groups to carboxylic acid groups) and of PSA tapes comprising the composition. ESO (2.74 g, containing about 12.0 mmol of oxirane groups) and sebacic acid (1.22 g of containing 12.1 mmol of carboxylic acid groups) were charged to a 50-mL, round-bottom flask equipped with a heating mantle and stirrer bar. The mixture was then heated by the preheated mantle (180° C.) with stirring. After the mixture became clear and colorless, the heating was continued for another four minutes at the same temperature to give a clear, pale greenish-yellow, viscous "syrup". The flask was then taken out of the mantle, and the syrup was quickly blade-coated on a sheet of white kraft paper with a glass rod at a coating level of about 8 mg/cm$^2$, to give a thin, continuous, uniform layer of clear, sort of sticky, long-fiber-forming, "wet" coating. Subsequently, the paper coated with the adhesive layer was placed in an air-circulating oven maintained at 160° C. The heat caused the cross-linking reaction of the coating composition. After 50 minutes in the oven, the coating became a clear, pale greenish-yellow, shiny, almost "dry" adhesive layer of sufficient cohesion strength, though leaving some blotches of no or little adhesive on the paper backing (probably due to retraction of the adhesive during polymerization and cross-linking). The finished PSA tape thus obtained possessed good initial tack, formed ropy structure upon removal of it from surfaces (e.g. metal, lacquer, glass, human skin) to which they are applied, and exhibited a good adhesive power of about 1.4 lbf/inch on stainless steel (type 302). The 90° peel adhesion test method and conditions are described in Example 2; the sample tape was almost cleanly removed in the test, leaving a little adhesive residue on the panel.

Example 8

This example describes the preparation of a PSA composition from ESO and succinic acid in a molar ratio of 1:1 oxirane groups to carboxylic acid groups and of PSA tapes comprising the composition. ESO (2.78 g, containing about 12.2 mmol of oxirane groups) and succinic acid (0.73 g, containing 12.4 mmol of carboxylic acid groups) were charged to a 50-mL, round-bottom flask equipped with a heating mantle and a magnetic stirring. The mixture was heated up to 180° C. by the preheated mantle with stirring, and heating was continued for five minutes at the same temperature to give a clear, pale greenish-yellow, and viscous "syrup". The flask was then taken out of the mantle, and the syrup was quickly blade-coated on a sheet of white kraft paper with a glass rod at a coating level of about 8.6 mg/cm$^2$, to give a thin, continuous, uniform layer of clear, pale greenish-yellow, sticky, fiber-forming and "wet" coating. Subsequently, the paper coated with the adhesive layer was placed in an air-circulating oven maintained at 160° C. The heat caused the cross-linking reaction of the coating composition. After 20 minutes in the oven, the coating became a clear, pale greenish-yellow, shiny, "dry" adhesive layer of sufficient cohesion strength, although some blotches of no or little adhesive on the paper backing were noticeable probably due to retraction of the adhesive during polymerization and cross-linking. The finished PSA tape thus obtained possessed good initial tack, formed ropy structure upon removal of it from surfaces (e.g. metal, lacquer, glass, human skin) to which they are applied, and exhibited a good adhesive power of about 2.3 lbf/inch on stainless steel (type 302). The 90° peel adhesion test method and conditions are described in Example 2; the sample was cleanly removed in the test, leaving no adhesive residue on the panel.

Example 9

This example describes the preparation of a PSA composition from ESO and succinic acid in a molar ratio of 1:1.53 oxirane groups to carboxylic acid groups and of PSA tapes comprising the said composition. ESO (2.35 g, containing about 10.3 mmol of oxirane groups) and succinic acid (0.93 g, containing 15.8 mmol of carboxylic acid groups) were charged to a 50-mL, round-bottom flask equipped with a heating mantle and a magnetic stirring. The mixture was then heated by the preheated mantle (160° C.) with stirring, and heating was continued for six minutes at the same temperature to give a clear, pale greenish-yellow and viscous "syrup". The flask was then taken out of the mantle, and the syrup was quickly blade-coated on a sheet of white kraft paper with a glass rod at a coating level of about 9 mg/cm$^2$, to give a thin, continuous, uniform layer of clear, pale greenish yellow, sticky, fiber-forming, "wet" coating. Subsequently, the paper coated with the adhesive layer was placed in an air-circulating oven maintained at 160° C. The heat caused the cross-linking reaction of the coating composition. After 25 minutes in the oven, the coating was converted into a clear, pale greenish-yellow, shiny, "dry" adhesive layer of sufficient cohesion strength, although some blotches of no or little adhesive on the paper backing were noticeable probably due to retraction of the adhesive during polymerization and cross-linking. The finished PSA tape thus obtained possessed good initial tack, formed ropy structure upon removal of it from surfaces (e.g. metal, lacquer, glass, human skin) to which they are applied, and exhibited a good adhesive power of about 2.1 lbf/inch on stainless steel (type 302). The 90° peel adhesion test method and conditions are described in Example 2; the sample was cleanly removed in the test, leaving no adhesive residue on the panel.

Example 10

This example describes the preparation of a PSA composition from ESO and succinic acid (in a molar ratio of 1:1.05 oxirane groups to carboxylic acid groups), and of PSA tapes by transferring said PSA composition from siliconised release liner. ESO (2.53 g, containing about 11.1 mmol of oxirane groups) and succinic acid (0.69 g, containing 11.7 mmol of carboxylic acid groups) were charged to a 50-mL, round-bottom flask equipped with a heating mantle and a magnetic stirring. The mixture was then heated by the preheated mantle (180° C.) with stirring, and heating was continued for five minutes at the same temperature to give a clear, pale greenish-yellow and viscous "syrup". The flask was then taken out of the mantle, and the syrup was quickly blade-coated on the siliconised side of a sheet of siliconised paper with a glass rod at a coating level of about 10 mg/cm², to give a thin, uniform layer of sticky, fiber-forming and "wet" coating. Subsequently, the adhesive coating was covered with a sheet of kraft paper, resulting in a "sandwich" which was then pressed with a rubber roller to achieve sufficient wet-out of the adhesive onto the kraft paper backing in order to provide adequate adhesion and complete transfer of the adhesive. And then, the siliconised paper was peeled off from the "sandwich", with most of the adhesive transferring to the paper backing, but still leaving random patches on the siliconised paper. Lastly, the paper backing coated with the adhesive layer was placed in an air-circulating oven maintained at 160° C. The heat caused the cross-linking reaction of the coating composition. After 25 minutes in the oven, the coating was converted into a clear, pale greenish-yellow, shiny, and "dry" adhesive layer of sufficient cohesion strength, but leaving some blotches of no or little adhesive on the paper backing (probably due to retraction of the adhesive during polymerization and cross-linking). The finished PSA tape thus obtained possessed fairly good initial tack, formed ropy structure upon removal of it from surfaces (e.g. metal, lacquer, glass, human skin) to which they are applied, and exhibited a good adhesive power of about 1.5 lbf/inch on stainless steel (type 302). The test method and conditions are described in Example 2; the sample tape was cleanly removed in the test, leaving no adhesive residue on the panel.

Example 11

This example describes the preparation of a PSA composition from ESO and adipic acid (in a molar ratio of 1:1.2 oxirane groups to carboxylic acid groups) and of PSA tapes comprising the composition. ESO (4.03 g, containing about 17.6 mmol of oxirane groups) and 1.53 g of adipic acid (containing 20.9 mmol of carboxylic acid groups) were charged to a 50-mL, round-bottom flask equipped with a heating mantle and a magnetic stirring. The mixture was then heated by the preheated mantle (160° C.) with stirring, to give a clear, almost colorless, "syrup" of low to medium viscosity. The flask was then taken out of the mantle, and the syrup was quickly blade-coated on a sheet of white kraft paper with a glass rod at a coating level of about 8 mg/cm², to give a thin, layer of not fiber-forming, "waxy" coating. Subsequently, the paper coated with the adhesive layer was placed in an air-circulating oven maintained at 160° C. The heat caused the polymerization and the cross-linking reaction of the coating composition. After 50 minutes in the oven, the coating was converted into a clear, pale greenish-yellow, shiny, "dry" adhesive layer of fairly sufficient cohesion strength, but obviously leaving blotches of no or little adhesive on the paper backing (probably due to retraction of the adhesive during polymerization and cross-linking). The finished PSA tape thus obtained possessed fairly good initial tack, formed ropy structure upon removal of it from surfaces (e.g. metal, lacquer, glass, human skin) to which they are applied.

Example 12

This example describes the preparation of a PSA composition from ESO and adipic acid in a molar ratio of 1:1.2 oxirane groups to carboxylic acid groups with the aid of solvent p-xylene, and of PSA tapes comprising the composition. ESO (0.95 g, containing about 4.16 mmol of oxirane groups), adipic acid (0.36 g, containing 4.9 mmol of carboxylic acid groups) and 0.39 g of p-xylene were charged to a 50-mL, round-bottom flask equipped with a heating mantle and a magnetic stirring. The mixture was heated up to 130° C. by the preheated mantle with stirring. After the mixture turned clear and colorless, heating was continued for another three minutes at the same temperature to give a sort of turbid, pale greenish-yellow "syrup" of medium viscosity. The flask was then taken out of the mantle, and the syrup was quickly blade-coated on a sheet of white kraft paper with a glass rod at a coating level of about 10 mg/cm², to give a thin, continuous, uniform layer of clear, pale greenish yellow, sort of sticky, fiber-forming, "wet" coating. Subsequently, the paper coated with the adhesive layer was placed in an air-circulating oven maintained at 160° C. The heat caused the cross-linking reaction of the coating composition. After 30 minutes in the oven, the coating was converted into a clear, pale greenish-yellow, shiny, "dry" adhesive layer of sufficient cohesion strength, but leaving some small blotches of no or little adhesive on the paper backing (probably due to retraction of the adhesive during polymerization and cross-linking). The finished PSA tape thus obtained possessed fairly good initial tack, formed ropy structure upon removal of it from surfaces (e.g. metal, lacquer, glass, human skin) to which they are applied, and exhibited a good adhesive power of about 3.1 lbf/inch on stainless steel (type 302). The 90° peel adhesion test method and conditions are described in Example 2; the sample was almost cleanly removed in the test, leaving only a little adhesive residue on the panel.

Example 13

This example describes the preparation of a PSA composition from ESO and adipic acid in a molar ratio of 1:1.2 oxirane groups to carboxylic acid groups and of PSA tapes comprising the composition with the aid of siliconised release liner. ESO (7.89 g, containing about 34.5 mmol of oxirane groups) and 3.03 g of adipic acid (containing 41.5 mmol of carboxylic acid groups) were charged to a 50-mL, round-bottom flask equipped with a heating mantle and stirrer bar. The mixture was heated by the preheated mantle (140° C.) with stirring. After the mixture turned clear and colorless, heating was continued for another nine minutes at the same temperature to give a clear (slightly turbid), pale greenish-yellow, viscous "syrup". The flask was then taken out of the mantle, and the syrup was quickly blade-coated on the siliconised side of a sheet of siliconised paper with a glass rod at a coating level of about 10 mg/cm², to give a thin, uniform layer of very sticky, fiber-forming and "wet" coating. Subsequently, the adhesive coating was then covered with a sheet of kraft paper, resulting in a "sandwich" which was then pressed with a rubber roller to achieve sufficient wet-out of the adhesive onto the kraft paper backing in order to provide adequate adhesion. Subsequently, the "sandwich" was placed in an air-circulating oven maintained at 160° C. The heat caused the cross-linking reaction of the coating composition. The "sandwich" was pressed again with the rubber roller after 20 minutes in the oven, and was taken out of the oven after 10 more minutes in the oven. The siliconised paper was then peeled off with adhesive completely transferred; and the coating on the paper backing was found to be converted into a clear, pale greenish-yellow, shiny, uniform, "dry" adhesive layer of sufficient cohesion strength. The finished PSA tape thus obtained possessed good initial tack, formed ropy structure upon removal of it from surfaces (e.g. metal, lacquer, glass, human skin) to which they are applied, and exhibited a good adhesive power of about 3.2 lbf/inch on stainless steel (type 302). The 90° peel adhesion test method and conditions are described in Example 2; the sample was almost cleanly removed in the test, leaving only a little adhesive residue on the panel.

Example 14

This example describes the preparation of a PSA composition from ESO and adipic acid in a molar ratio of 1:1.2 oxirane groups to carboxylic acid groups, and of polypropylene tapes comprising the composition with the aid of siliconised released liner. ESO (3.68 g, containing about 16.1 mmol of oxirane groups) and adipic acid (1.45 g, containing 19.8 mmol of carboxylic acid groups) were charged to a 50-mL, round-bottom flask equipped with a heating mantle and a magnetic stirring. The mixture was heated by the preheated mantle (140° C.) with stirring. After the mixture turned clear and colorless, heating was continued for another 4.5 minutes at the same temperature to give a clear (slightly turbid), pale greenish-yellow, viscous "syrup". The flask was then taken out of the mantle, and the syrup was quickly blade-coated on the siliconised side of a sheet of siliconised paper with a glass rod at a coating level of about 10 mg/cm², to give a thin, uniform layer of very sticky, fiber-forming and "wet" coating. Subsequently, the adhesive coating was then covered with a sheet of PP film, resulting in a "sandwich" which was then pressed with a rubber roller to achieve sufficient wet-out of the adhesive onto the kraft paper backing in order to provide adequate adhesion. Subsequently, the "sandwich" was placed in an air-circulating oven maintained at 130° C. The heat caused the cross-linking reaction of the coating composition. The "sandwich" was pressed again with the rubber roller after 30 minutes in the oven, and was taken out of the oven after 120 more minutes in the oven. The siliconised paper was then peeled off with adhesive completely transferred; and the coating on the polypropylene film was found to be converted into a clear, pale greenish-yellow, shiny, uniform/even, "dry" adhesive layer of sufficient cohesion strength. The finished PSA tape thus obtained possessed fairly good initial tack, formed ropy structure upon removal of it from surfaces (e.g. metal, lacquer, glass, human skin) to which they are applied, and exhibited a good adhesive power of about 2.2 lbf/inch on stainless steel (type 302). The 90° peel adhesion test method and conditions are described in Example 2; the sample was almost cleanly removed in the test, leaving little adhesive residue on the panel.

Example 15

This example describes the preparation of a PSA composition from ESO, adipic acid and lauric acid (oxirane groups/carboxylic acid groups molar ratio, 1:1), and of PSA tapes comprising the composition. ESO (2.3 g, containing about 10.1 mmol of oxirane groups), adipic acid (0.6 g, containing 8.2 mmol of carboxylic acid groups) and lauric acid (0.4 g, containing 2.0 mmol of carboxylic acid groups) were charged to a 50-mL, round-bottom flask equipped with a heating mantle and a magnetic stirring. The mixture was heated by the preheated mantle (160° C.) with stirring. After the mixture turned clear and colorless, the heating was continued for another 3.5 minutes at the same temperature to give a clear (sort of turbid), pale greenish-yellow, "syrup" of low to medium viscosity. The flask was then taken out of the mantle, and the syrup was quickly blade-coated on a sheet of white kraft paper with a glass rod at a coating level of about 7 mg/cm², to give a thin, continuous, uniform layer of clear, pale greenish-yellow, sort of sticky, short-fiber-forming, "wet" coating. Subsequently, the paper coated with the adhesive layer was placed in an air-circulating oven maintained at 160° C. The heat caused the cross-linking reaction of the coating composition. The coating was converted into a pale greenish-yellow, clear, shiny, "dry" adhesive layer of sufficient cohesion strength after 90 minutes in the oven. However some small patches of no or little adhesive on the paper backing were noticeable probably due to retraction of the adhesive during polymerization and cross-linking. The finished PSA tape thus obtained possessed fairly good initial tack, formed ropy structure upon removal of it from surfaces (e.g. metal, lacquer, glass, human skin) to which they are applied, and exhibited a good adhesive power of about 1.5 lbf/inch on stainless steel (type 302). The 90° peel adhesion test method and conditions are described in Example 2; the sample was almost cleanly removed in the test, leaving only a little adhesive residue on the panel.

Example 16

This example describes the preparation of a PSA composition from ESO, adipic acid and lauric acid (oxirane group/carboxylic acid group molar ratio, 1:1.14) in two steps, and of PSA tapes comprising the composition. ESO (6.32 g, containing about 27.7 mmol of oxirane groups) and lauric acid (1.28 g, containing 6.39 mmol of carboxylic acid groups) were charged to a 50-mL, round-bottom flask equipped with a heating mantle and a magnetic stirring. The mixture was heated by the preheated mantle (139° C.) with stirring, and the heating was continued for 75 minutes at the same temperature to give a clear, yellow liquid of low to medium viscosity. The temperature of mantle was then raised to 160° C., and adipic acid (1.85 g, containing 25.3 mmol of carboxylic acid groups) was added slowly to the mixture while stirring. The flask was taken out of the mantle after eight more minutes, and the viscous syrup was quickly blade-coated on a sheet of white kraft paper with a glass rod at a coating level of about 10 mg/cm², to give a thin, continuous, uniform layer of clear, pale yellow, sort of sticky, short-fiber-forming, "wet" coating. Subsequently, the paper coated with the adhesive layer was placed in an air-circulating oven maintained at 160° C. The heat caused the cross-linking reaction of the coating composition. The coating was converted into a clear, pale greenish-yellow, shiny, "dry" adhesive layer of sufficient cohesion strength after 100 minutes in the oven. However, some small patches of no or little adhesive on the paper backing were noticeable probably due to retraction of the adhesive during polymerization and cross-linking. The finished PSA tape thus obtained possessed fairly good initial tack, formed ropy structure upon removal of it from surfaces (e.g. metal, lacquer, glass, human skin) to which they are applied, and exhibited a good adhesive power of about 2.5 lbf/inch on stainless steel (type 302). The 90° peel adhesion test method and conditions are described in Example 2; the sample was almost cleanly removed in the test, leaving only a little adhesive residue on the panel.

Example 17

This example describes the preparation of a PSA composition from ESO, adipic acid and lauric acid (oxirane group/ carboxylic acid group molar ratio, 1:1.16) in two steps, and PSA tapes comprising the composition. ESO (6.38 g, containing about 27.9 mmol of oxirane groups) and acetic acid (0.48 g, containing 8.0 mmol of carboxyl groups) were charged to a 50-mL, round-bottom flask equipped with a heating mantle and a magnetic stirring. The mixture was heated by the preheated mantle (120° C.) with stirring, and the heating was continued for 90 minutes at the same temperature to give a clear, yellow liquid of low to medium viscosity. The temperature of mantle was then raised to 160° C., and 1.78 g of adipic acid (containing 24.4 mmol of carboxylic acid groups) was added slowly to the mixture while stirring. The flask was taken out of the mantle after ten more minutes, and the viscous syrup was quickly blade-coated on a sheet of white kraft paper with a glass rod at a coating level of about 10 mg/cm², to give a thin, continuous, uniform layer of clear, pale yellow, sort of sticky, short-fiber-forming, "wet" coating. Subsequently, the paper coated with the adhesive layer was placed in an air-circulating oven maintained at 160° C. The heat caused the cross-linking reaction of the coating composition. The coating was converted into a clear, pale greenish-yellow, shiny, "dry" adhesive layer of sufficient cohesion strength after 60 minutes in the oven, However, some small patches of no or little adhesive on the paper backing were still noticeable probably due to retraction of the adhesive during polymerization and cross-linking. The finished PSA tape thus obtained possessed fairly good initial tack, formed ropy structure upon removal of it from surfaces (e.g. metal, lacquer, glass, human skin) to which they are applied, and exhibited a good adhesive power of about 2.3 lbf/inch on stainless steel (type 302). The 90° peel adhesion test method and conditions are described in Example 2; the sample was almost cleanly removed in the test, leaving only a little adhesive residue on the panel.

Example 18

This example describes the preparation of a PSA composition from ESO, adipic acid and lauric acid (oxirane group/ carboxyl group molar ratio, 1:1.14) in two steps, and the preparation of PSA tapes comprising the composition with the aid of siliconised released liner. ESO (4.53 g, containing about 19.8 mmol of oxirane groups) and acetic acid (0.35 g, containing 5.83 mmol of carboxylic acid groups) were charged to a 50-mL, round-bottom flask equipped with a heating mantle and a magnetic stirring. The mixture was heated by the preheated mantle (120° C.) with stirring, and heating was continued for 160 minutes at the same temperature to give a clear, yellow liquid of low to medium viscosity. The temperature of mantle was then raised to 130° C., and 1.23 g of adipic acid (containing 16.8 mmol of carboxyl groups) was added slowly to the mixture while stirring. The flask was then taken out of the mantle after 13 more minutes, and the clear, viscous syrup was quickly blade-coated on the siliconised side of a sheet of white kraft paper with a glass rod at a coating level of about 7 mg/cm², to give a thin, continuous, uniform layer of clear, pale yellow, very sticky, fiber-forming, "wet" coating. Subsequently, the adhesive coating was then covered with a sheet of kraft paper, resulting in a "sandwich" which was then pressed with a rubber roller to achieve sufficient wet-out of the adhesive onto the kraft paper backing in order to provide adequate adhesion. Lastly, the "sandwich" was placed in an air-circulating oven maintained at 160° C. The heat caused the cross-linking reaction of the coating composition. The "sandwich" was taken out of the oven after 60 minutes in the oven. The siliconised paper was peeled off with adhesive almost completely transferred; and the coating on the paper backing was found to be converted into a clear, pale greenish-yellow, shiny, uniform, "dry" adhesive layer of sufficient cohesion strength. The finished PSA tape thus obtained possessed fairly good initial tack, formed ropy structure upon removal of it from surfaces (e.g. metal, lacquer, glass, human skin) to which they are applied, and exhibited a good adhesive power of about 2.5 lbf/inch on stainless steel (type 302). The 90° peel adhesion test method and conditions are described in Example 2; the sample was almost cleanly removed in the test, leaving a little adhesive residue on the panel.

Example 19

This example describes the preparation of a PSA composition from ESO and adipic acid in a molar ratio of 1:1.2 oxirane groups to carboxylic acid groups, and of PSA tapes comprising the composition with the aid of two siliconized release liners with different adhesion-repellence properties for the adhesive composition. ESO (2.82 g, containing about 12.3 mmol of oxirane groups) was charged to a 50-mL, round-bottom flask equipped with a silicon oil bath and magnetic stirring, and heated up to 135° C. by the preheated oil bath with stirring, after which the resulting clear and colorless liquid was maintained at the same temperature. To the flask, 1.06 g of adipic acid (containing 14.5 mmol of carboxylic acid groups) was then added over 3 minutes to give a clear (slightly turbid), almost colorless solution of low viscosity. Heating and stirring (600 rpm) were continued for another 23 minutes at the same temperature to give a clear (slightly turbid), pale greenish-yellow, viscous "syrup". When the magnetic stirring bar could not work smoothly above a stirring speed of 200 rpm, the flask was then taken out of the oil bath, and the syrup was quickly blade-coated on the siliconised face of a sheet of partially siliconized release liner with a glass rod at a coating level of about 3 mg/cm², to give a thin, uniform layer of sticky, fiber-forming and "wet" coating layer. The adhesive layer was then carefully covered (the siliconized face inwardly) with a sheet of fully siliconized release liner with, resulting in a "sandwich" which was then pressed with a rubber roller to achieve a good contact between the adhesive composition and the two liners. Subsequently, the "sandwich" was placed in an air-circulating oven maintained at 160° C. The heat caused the cross-linking reaction of the coating composition. The "sandwich" was taken out of the oven after 30 minutes in the oven. The fully siliconized released liner was quickly peeled off without taking away any adhesive composition; a sheet of paper was immediately and carefully covered on the adhesive layer. The new "sandwich" was then pressed with a rubber roller to achieve sufficient wet-out of the adhesive onto the paper backing in order to provide adequate adhesion. After the "sandwich" was cooled down, the partially siliconized release liner could be easily peeled off with the adhesive composition being completely transferred to the paper backing. The siliconized release liner can be optionally left for the protection of the adhesive layers on the paper backing or be recovered for re-use. The adhesive coating on the paper backing was a thin, clear, pale greenish-yellow, shiny, uniform, "dry" adhesive layer of sufficient cohesion strength, and was not found to penetrate the paper backing to give an oily appearance of the PSA tape. The finished PSA tape thus obtained possessed good initial tack, formed ropy structure upon removal of it from surfaces (e.g. metal, lacquer, glass, human skin) to which they are applied, and exhibited a good adhesive power of about 2.8 lbf/inch on stainless steel (type 302). The 90° peel adhesion test method and conditions are described in Example 2; the sample was cleanly removed in the test, leaving no adhesive residue on the panel.

Example 20

This example describes the preparation of a PSA composition from ESO and adipic acid in a molar ratio of 1:1.2 oxirane groups to carboxylic acid groups in the presence of hexadecyltrimethyl ammonium bromide (1.0 wt % based on the weight of the reaction mixture), and of PSA tapes comprising the composition. ESO (2.36 g, containing about 10.3 mmol of oxirane groups) was charged to a 50-mL, round-bottom flask equipped with a silicon oil bath and magnetic stirring, heated up to 135° C. by the preheated oil bath with stirring, and the resulting clear and colorless liquid was maintained at the same temperature. To the flask, 0.89 g of adipic acid (containing 12.2 mmol of carboxylic acid groups) was then added portion-wise over 5 minutes to give a clear (slightly turbid), almost colorless solution of low viscosity. After five more minutes, 0.033 g of hexadecyltrimethyl ammonium bromide was added to the reaction mixture. Heating and stirring (600 rpm) were thereupon continued for another 18 minutes at the same temperature to give a clear (slightly turbid), pale greenish-yellow, viscous "syrup" (at this point, the magnetic stirring bar could not work smoothly above a stirring speed of 200 rpm). The flask was then taken out of the oil bath, and the syrup was quickly blade-coated on a sheet of white paper with a glass rod at a coating level of about 6 mg/cm$^2$, to give a thin, continuous, uniform layer of sticky, long-fiber-forming, "wet" coating. Subsequently, the paper coated with the adhesive layer was placed in an air-circulating oven maintained at 160° C. The heat caused the cross-linking reaction of the coating composition. The paper coated with the adhesive layer was taken out of the oven after 6 minutes in the oven. The finished PSA tape had a clear, pale greenish-yellow, shiny, "dry" adhesive layer of sufficient cohesion strength, possessed good initial tack, formed ropy structure upon removal of it from surfaces (e.g. metal, lacquer, glass, human skin) to which they are applied, and exhibited a good adhesive power of about 2.5 lbf/inch on stainless steel (type 302). The 90° peel adhesion test method and conditions are described in Example 2; the sample was cleanly removed in the test, leaving no adhesive residue on the panel.

Example 21

This example describes the preparation of a PSA composition from ESO and adipic acid in a molar ratio of 1:1.2 oxirane groups to carboxylic acid groups in the presence of triethanolamine (1.4 wt % based on the weight of the reaction mixture), and of PSA tapes comprising the composition. ESO (3.34 g, containing about 14.6 mmol of oxirane groups) was charged to a 50-mL, round-bottom flask equipped with a silicon oil bath and magnetic stirring, heated up to 135° C. by the preheated oil bath with stirring, and the resulting clear and colorless liquid was maintained at the same temperature. To the flask, 1.28 g of adipic acid (containing 17.5 mmol of carboxylic acid groups) was then added over 3 minutes to give a clear (slightly turbid), almost colorless solution of low viscosity. After five more minutes, 0.065 g of triethanolamine was added to the reaction mixture. Heating and stirring (600 rpm) were thereupon continued for another 10 minutes at the same temperature to give a clear (slightly turbid), pale orange-yellow, viscous "syrup" (at this point, the magnetic stirring bar could not work smoothly above a stirring speed of 200 rpm). The flask was then taken out of the oil bath, and the syrup was quickly blade-coated on a sheet of white paper with a glass rod at a coating level of about 6 mg/cm$^2$, to give a thin, continuous, uniform layer of sticky, long-fiber-forming, "wet" coating. Subsequently, the paper coated with the adhesive layer was placed in an air-circulating oven maintained at 160° C. The heat caused the cross-linking reaction of the coating composition. The paper coated with the adhesive layer was taken out of the oven after 4 minutes in the oven. The finished PSA tape had a clear, pale yellow, shiny, "dry" adhesive layer of sufficient cohesion strength, possessed good initial tack, formed ropy structure upon removal of it from surfaces (e.g. metal, lacquer, glass, human skin) to which they are applied, and exhibited a good adhesive power of about 2.6 lbf/inch on stainless steel (type 302). The 90° peel adhesion test method and conditions are described in Example 2; the sample was cleanly removed in the test, leaving no adhesive residue on the panel.

Example 22

This example describes the preparation of a PSA composition from ESO and adipic acid in a molar ratio of 1:1.2 oxirane groups to carboxylic acid groups in the presence of chromium (III) tris(acetylacetonate) (0.2 wt % based on the weight of the reaction mixture), and of PSA tapes comprising the composition. ESO (2.66 g, containing about 11.6 mmol of oxirane groups) was charged to a 50-mL, round-bottom flask equipped with a silicon oil bath and magnetic stirring, heated up to 135° C. by the preheated oil bath with stirring, and the resulting clear and colorless liquid was maintained at the same temperature. To the flask, 1.00 g of adipic acid (containing 13.9 mmol of carboxylic acid groups) was then added over 3 minutes to give a clear (slightly turbid), almost colorless solution of low viscosity. After four more minutes, 0.007 g of chromium (III) tris(acetylacetonate) was added to the reaction mixture. Heating and stirring (600 rpm) were thereupon continued for another 8 minutes at the same temperature to give a clear (slightly turbid), pale olive-yellow, viscous "syrup" (at this point, the magnetic stirring bar could not work smoothly above a stirring speed of 200 rpm). The flask was then taken out of the oil bath, and the syrup was quickly blade-coated on a sheet of white paper with a glass rod at a coating level of about 6 mg/cm$^2$, to give a thin, continuous, uniform layer of sticky, long-fiber-forming, "wet" coating. Subsequently, the paper coated with the adhesive layer was placed in an air-circulating oven maintained at 160° C. The heat caused the cross-linking reaction of the coating composition. The paper coated with the adhesive layer was taken out of the oven after 4 minutes in the oven. The finished PSA tape had a clear, pale yellow, shiny, "dry" adhesive layer of sufficient cohesion strength, possessed good initial tack, formed ropy structure upon removal of it from surfaces (e.g. metal, lacquer, glass, human skin) to which they are applied, and exhibited a good adhesive power of about 2.6 lbf/inch on stainless steel (type 302). The 90° peel adhesion test method and conditions are described in Example 2; the sample was cleanly removed in the test, leaving no adhesive residue on the panel.

In view of the many possible embodiments to which the principles of the disclosed compositions, articles of manufacture, and processes may be applied, it should be recognized that the illustrated embodiments are only preferred examples of the invention and should not be taken as limiting the scope of the invention.

What is claimed is:

1. A pressure sensitive adhesive composition made by a method comprising:
    initially reacting an epoxidized vegetable oil with at least one dibasic acid or anhydride thereof to produce a prepolymer product, wherein the amount of dibasic acid or anhydride reacted with the epoxidized vegetable oil is sufficient to provide a 5 to 80 mol % excess of carboxylic acid groups over that required to esterify all the epoxy groups present in the at least one epoxidized vegetable oil; and
    further reacting the prepolymer product to produce the pressure sensitive adhesive composition.

2. The composition of claim 1, wherein the epoxidized vegetable oil is epoxidized soybean oil.

3. The composition of claim 2, wherein the dibasic acid or anhydride is selected from malonic acid, succinic acid, glutaric acid, adipic acid, pimelic acid, suberic acid, azelaic acid, sebacic acid, brassylic acid, succinic anhydride, or a mixture thereof.

4. The composition of claim 2, wherein the dibasic acid or anhydride is an aliphatic saturated carboxylic dibasic acid or anhydride.

5. The composition of claim 1, wherein the dibasic acid or anhydride is a dicarboxylic acid or anhydride thereof.

6. The composition of claim 1, wherein the dibasic acid or anhydride is selected from malonic acid, succinic acid, glutaric acid, adipic acid, pimelic acid, suberic acid, azelaic acid, sebacic acid, brassylic acid, succinic anhydride, or a mixture thereof.

7. The composition of claim 1, wherein the vegetable oil and dibasic acid or anhydride are all from renewable sources.

8. The composition of claim 1, wherein the epoxidized vegetable oil has an epoxy number of 2 to 5.

9. The composition of claim 1, wherein the dibasic acid or anhydride is an aliphatic saturated carboxylic dibasic acid or anhydride.

10. The composition of claim 1, wherein initially reacting the epoxidized vegetable oil with at least one dibasic acid or anhydride thereof comprises heating a mixture of the epoxidized vegetable oil and at least one dibasic acid or anhydride at a temperature of 80 to 300° C.

11. The composition of claim 1, wherein the further reacting of the prepolymer product comprises heating the prepolymer product at a temperature of 100 to 300° C.

* * * * *